(12) United States Patent
Pritzkau et al.

(10) Patent No.: US 10,536,476 B2
(45) Date of Patent: Jan. 14, 2020

(54) REALTIME TRIGGERING FRAMEWORK

(71) Applicant: SAP SE, Walldorf (DE)

(72) Inventors: Eugen Pritzkau, Wiesloch (DE); Kathrin Nos, Nussloch (DE); Marco Rodeck, Maikammer (DE); Florian Chrosziel, St. Leon-Rot (DE); Jona Hassforther, Heidelberg (DE); Rita Merkel, Ilvesheim (DE); Thorsten Menke, Bad Iburg (DE); Thomas Kunz, Lobbach/Lobenfeld (DE); Hartwig Seifert, Elchesheim-Illingen (DE); Harish Mehta, Wiesenbach (DE); Wei-Guo Peng, Dallau (DE); Lin Luo, Wiesloch (DE); Nan Zhang, Schriesheim (DE); Hristina Dinkova, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/216,201

(22) Filed: Jul. 21, 2016

(65) Prior Publication Data

US 2018/0027010 A1    Jan. 25, 2018

(51) Int. Cl.
*H04L 29/06* (2006.01)
*H04L 29/08* (2006.01)

(52) U.S. Cl.
CPC .......... *H04L 63/1433* (2013.01); *H04L 67/02* (2013.01)

(58) Field of Classification Search
CPC . H04L 63/1433; H04L 43/10; H04L 63/1416; H04L 63/1425; H04L 67/02; H04L 29/06911; H04L 29/06925; H04L 29/06931; H04L 29/06938; G06F 21/55

USPC ............................................................. 726/23
See application file for complete search history.

(56) References Cited

U.S. PATENT DOCUMENTS

| | | | |
|---|---|---|---|
| 5,440,726 A | 8/1995 | Fuchs | |
| 5,960,170 A * | 9/1999 | Chen | G06F 21/564 714/26 |
| 6,173,418 B1 | 1/2001 | Fujino et al. | |
| 6,629,106 B1 * | 9/2003 | Narayanaswamy | G06F 11/0709 |
| 6,779,001 B1 | 8/2004 | Kanai et al. | |
| 7,376,969 B1 * | 5/2008 | Njemanze | G06F 21/55 709/224 |
| 7,380,205 B2 | 5/2008 | Bezrukov et al. | |
| 7,441,197 B2 | 10/2008 | Tschiegg et al. | |
| 7,457,792 B2 | 11/2008 | Weigt et al. | |
| 7,457,793 B2 | 11/2008 | Weigt et al. | |
| 7,457,794 B2 | 11/2008 | Weigt et al. | |

(Continued)

OTHER PUBLICATIONS

Office Action in related U.S. Appl. No. 15/274,569 dated Apr. 16, 2018; 11 pages.

(Continued)

*Primary Examiner* — Shahriar Zarrineh
(74) *Attorney, Agent, or Firm* — Fish & Richardson P.C.

(57) ABSTRACT

A computer-implemented method generates a trigger registration for a selected triggering type. The generated trigger registration is stored in a triggering persistency. A received event from an event persistency is analyzed and data associated with the analyzed event is compared with the triggering persistency. Based on the comparison and using a pattern execution framework, an enterprise threat detection (ETD) pattern is processed to perform actions responsive to the received event.

20 Claims, 6 Drawing Sheets

(56) References Cited

U.S. PATENT DOCUMENTS

| | | |
|---|---|---|
| 7,545,969 B2 | 6/2009 | Bennett |
| 7,624,092 B2 | 11/2009 | Lieske et al. |
| 7,627,544 B2 * | 12/2009 | Chkodrov .............. G06Q 10/10 703/17 |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 * | 4/2011 | Kienzle .............. H04L 41/0604 709/224 |
| 7,961,633 B2 * | 6/2011 | Shankar .............. H04L 63/1416 370/242 |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 * | 4/2016 | Deshpande ............ H04N 5/247 |
| 9,336,385 B1 * | 5/2016 | Spencer .............. H04L 63/1441 |
| 9,348,665 B2 | 5/2016 | Storz et al. |
| 9,383,934 B1 | 7/2016 | Likacs |
| 9,419,989 B2 * | 8/2016 | Harris ................. H04L 63/1416 |
| 9,524,389 B1 | 12/2016 | Roth |
| 9,619,984 B2 | 4/2017 | Donovan |
| 9,690,931 B1 * | 6/2017 | Anantharaju .......... G06F 21/55 |
| 9,779,147 B1 | 10/2017 | Sherman et al. |
| 9,779,150 B1 | 10/2017 | Sherman |
| 9,843,596 B1 | 12/2017 | Averbuch |
| 9,979,741 B2 | 5/2018 | Fuhrman |
| 1,000,138 A1 | 6/2018 | Das et al. |
| 10,079,842 B1 | 9/2018 | Brandwine et al. |
| 1,010,237 A1 | 10/2018 | Seifert et al. |
| 10,140,447 B2 | 11/2018 | Rahaman et al. |
| 10,148,675 B1 | 12/2018 | Brandwine et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2006/0037075 A1 * | 2/2006 | Frattura ............... H04L 41/042 726/22 |
| 2006/0059115 A1 | 3/2006 | Gulfleisch et al. |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McEligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 * | 11/2007 | Henmi .................. G06F 9/4843 718/102 |
| 2007/0283192 A1 | 12/2007 | Shevchenko |
| 2007/0300296 A1 | 12/2007 | Kudla |
| 2008/0033966 A1 * | 2/2008 | Wahl ..................... G06F 21/6218 |
| 2008/0034425 A1 * | 2/2008 | Overcash ............... G06F 21/55 726/22 |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 * | 11/2008 | Tsvetanov ........... H04L 63/1425 726/23 |
| 2008/0320552 A1 * | 12/2008 | Kumar ................ G06F 21/552 726/1 |
| 2009/0044277 A1 * | 2/2009 | Aaron ................. H04L 63/1408 726/25 |
| 2009/0049518 A1 * | 2/2009 | Roman ............... H04L 41/0893 726/1 |
| 2009/0288164 A1 | 11/2009 | Adelstein |
| 2009/0293046 A1 * | 11/2009 | Cheriton ................ G06F 8/437 717/136 |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 * | 12/2011 | Yao ....................... G06F 21/316 713/171 |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 * | 8/2013 | Drissi ................. G06F 21/55 726/22 |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 * | 12/2013 | Karta .................. H04L 63/1441 726/23 |
| 2014/0047413 A1 | 2/2014 | Sheive et al. |
| 2014/0201836 A1 * | 7/2014 | Amsler ............... H04L 63/1425 726/23 |
| 2014/0223283 A1 | 8/2014 | Hancock |
| 2014/0244623 A1 | 8/2014 | King |
| 2014/0317681 A1 | 10/2014 | Shende |
| 2015/0007325 A1 * | 1/2015 | Eliseev ................. G06F 21/566 726/24 |
| 2015/0067880 A1 | 3/2015 | Ward |
| 2015/0073868 A1 | 3/2015 | Garman |
| 2015/0106867 A1 | 4/2015 | Liang |
| 2015/0143521 A1 * | 5/2015 | Eliseev ................. G06F 21/56 726/23 |
| 2015/0154524 A1 | 6/2015 | Borodow |
| 2015/0180891 A1 | 6/2015 | Seward |
| 2015/0215329 A1 * | 7/2015 | Singla ................ H04L 63/1416 726/23 |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 * | 11/2015 | Kirti .................. H04L 67/306 726/23 |
| 2015/0341389 A1 | 11/2015 | Kurakami |

(56) References Cited

U.S. PATENT DOCUMENTS

| | | |
|---|---|---|
| 2015/0347751 A1 | 12/2015 | Card et al. |
| 2015/0355957 A1* | 12/2015 | Steiner ............... G06F 11/0772 714/37 |
| 2015/0358344 A1 | 12/2015 | Mumcuoglu |
| 2015/0381646 A1* | 12/2015 | Lin ..................... H04L 63/1416 726/23 |
| 2016/0057166 A1* | 2/2016 | Chesla .................. H04L 63/02 726/23 |
| 2016/0057167 A1* | 2/2016 | Bach ..................... H04L 63/101 726/23 |
| 2016/0065594 A1 | 3/2016 | Srivastava et al. |
| 2016/0092535 A1 | 3/2016 | Kuchibhotla et al. |
| 2016/0127391 A1* | 5/2016 | Kobres ............... H04L 63/1416 726/23 |
| 2016/0202893 A1 | 7/2016 | Mustonen et al. |
| 2016/0226905 A1 | 8/2016 | Baikalov et al. |
| 2016/0248798 A1 | 8/2016 | Cabrera et al. |
| 2016/0291982 A1* | 10/2016 | Mizrahi ................ G06F 9/3808 |
| 2016/0292061 A1 | 10/2016 | Marron |
| 2016/0337384 A1* | 11/2016 | Jansson ............ G06F 17/30876 |
| 2016/0359886 A1* | 12/2016 | Yadav ................. H04L 63/1425 |
| 2016/0364315 A1* | 12/2016 | Lee .................... G06F 11/3632 |
| 2016/0364571 A1 | 12/2016 | Lee |
| 2016/0364740 A1 | 12/2016 | Parker |
| 2016/0373476 A1* | 12/2016 | Dell'Anno ........ G06F 17/30563 |
| 2016/0378978 A1* | 12/2016 | Singla ..................... G06F 21/55 726/23 |
| 2016/0381049 A1 | 12/2016 | Lakhani |
| 2017/0004005 A1* | 1/2017 | Elliott ................... G06F 9/4812 |
| 2017/0026400 A1* | 1/2017 | Adams ................ H04L 63/1433 |
| 2017/0031002 A1 | 2/2017 | Newton et al. |
| 2017/0034023 A1 | 2/2017 | Nickolov |
| 2017/0070415 A1 | 3/2017 | Bell et al. |
| 2017/0091008 A1 | 3/2017 | Cherbakov |
| 2017/0093902 A1 | 3/2017 | Roundy et al. |
| 2017/0148060 A1 | 5/2017 | Showers |
| 2017/0169217 A1 | 6/2017 | Rahaman |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1 | 10/2017 | Tibshirani et al. |
| 2017/0302685 A1 | 10/2017 | Ladnai et al. |
| 2017/0308602 A1 | 10/2017 | Raghunathan et al. |
| 2017/0316026 A1 | 11/2017 | Kanthak et al. |
| 2017/0322993 A1 | 11/2017 | Brodt et al. |
| 2017/0324766 A1 | 11/2017 | Gonzalez |
| 2018/0027002 A1 | 1/2018 | Rodeck et al. |
| 2018/0059876 A1 | 3/2018 | Peng et al. |
| 2018/0063167 A1 | 3/2018 | Rodeck |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |

OTHER PUBLICATIONS

Office Action in related U.S. Appl. No. 15/246,053 dated May 21, 2018; 14 pages.

Office Action in related U.S. Appl. No. 15/380,379 dated Jul. 19, 2018; 9 pages.

Office Action in related U.S. Appl. No. 15/274,693 dated Jul. 26, 2018; 14 pages.

Office Action in related U.S. Appl. No. 15/383,771 dated Aug. 3, 2018; 12 pages.

U.S. Office Action in related U.S. Appl. No. 15/274,569 dated Nov. 14, 2018, 11 pages.

U.S. Office Action in related U.S. Appl. No. 15/274,693 dated Feb. 11, 2019, 13 pages.

U.S. Office Action in related U.S. Appl. No. 15/253,438 dated Sep. 19, 2018, 17 pages.

U.S. Office Action in related U.S. Appl. No. 15/246,053 dated Sep. 24, 2018, 14 pages.

U.S. Office Action in related U.S. Appl. No. 15/370,084 dated Aug. 27, 2018, 14 pages.

U.S. Office Action in related U.S. Appl. No. 15/370,084 dated Feb. 4, 2019, 9 pages.

U.S. Office Action in related U.S. Appl. No. 15/380,450 dated Aug. 27, 2018, 19 pages.

U.S. Office Action in related U.S. Appl. No. 15/380,450 dated Jan. 23, 2019, 21 pages.

U.S. Office Action in related U.S. Appl. No. 15/380,450 dated Nov. 2, 2018, 19 pages.

U.S. Office Action in related U.S. Appl. No. 15/381,567 dated Nov. 2, 2018, 17 pages.

U.S. Office Action in related U.S. Appl. No. 15/383,771 dated Jan. 23, 2019, 14 pages.

Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.

Final Office Action issued in U.S. Appl. No. 15/381,567 dated May 22, 2019, 28 pages.

Non-Final Office Action issued in U.S. Appl. No. 15/216,046 dated Apr. 29, 2019, 23 pages.

Non-Final Office Action issued in U.S. Appl. No. 15/246,053 dated May 17, 2019, 28 pages.

Non-Final Office Action issued in U.S. Appl. No. 15/274,569 dated Mar. 22, 2019, 11 pages.

Office Action issued in U.S. Appl. No. 15/847,478, dated Aug. 6, 2019, 36 pages.

Office Action issued in U.S. Appl. No. 15/216,046 dated Aug. 21, 2019, 23 pages.

U.S. Office Action in related U.S. Appl. No. 15/383,771 dated Jul. 5, 2019, 16 pages.

Non-Final Office Action issued in U.S. Appl. No. 15/639,863 dated Jun. 24, 2019, 37 pages.

* cited by examiner

REALTIME TRIGGERING FRAMEWORK

BACKGROUND

Enterprise threat detection (ETD) typically allows analyzing log data from various enterprise computing systems over known ETD patterns indicating threats to the computing systems. Currently the ETD patterns are processed on a periodic basis, for example, every ten minutes. For this example timeframe, it can take up to ten minutes before a threat can be detected using the EDT pattern; potentially allowing data theft, damage, etc. (including possibly to the ETD system itself) to occur within the enterprise computing system until the threat detection system processes log data against the ETD patterns at the next period threshold. However, increasing the period frequency (for example, to process an ETD pattern every minute or more frequently), raises computational and resource loads on one or more computers due to the increased frequency of processing. As some types of enterprise computing system attacks occur very infrequently (for example, less than once per month), an approach to increase the period frequency is in conflict with a goal to decrease computer operation costs.

SUMMARY

The present disclosure describes methods and systems, including computer-implemented methods, computer program products, and computer systems for realtime enterprise threat detection (ETD).

In an implementation, a computer-implemented method generates a trigger registration for a selected triggering type. The generated trigger registration is stored in a triggering persistency. A received event from an event persistency is analyzed and data associated with the analyzed event is compared with the triggering persistency. Based on the comparison and using a pattern execution framework, an enterprise threat detection (ETD) pattern is processed to perform actions responsive to the received event.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, execution occurs in realtime or in substantially realtime. Immediately after a log entry arrives in an event persistency, an alert can be detected and reported if applicable to the log entry. Second, execution of an ETD pattern can be on demand. With triggered ETD patterns there are no unneeded scheduled ETD pattern executions that results in negative findings. This saves computing (hardware and software) resources. Third, ETD patterns are executed in parallel with processing threads. Different ETD patterns triggered through the same log entry/entries are executed at the same time. This allows a potential threat to be reported sooner than running each ETD pattern sequentially. In sequential execution some delays would occur. Fourth, complex and expensive ETD patterns can be divided into a chain of simple ETD patterns. This division can reduce complexity and allows a chain to be broken if one of the chained ETD patterns results in no findings. Fifth, at some point in the execution of an ETD pattern chain, a fork (for example, calling several ETD patterns simultaneously) can be performed. This forking permits faster execution and receipt of ETD pattern execution results. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
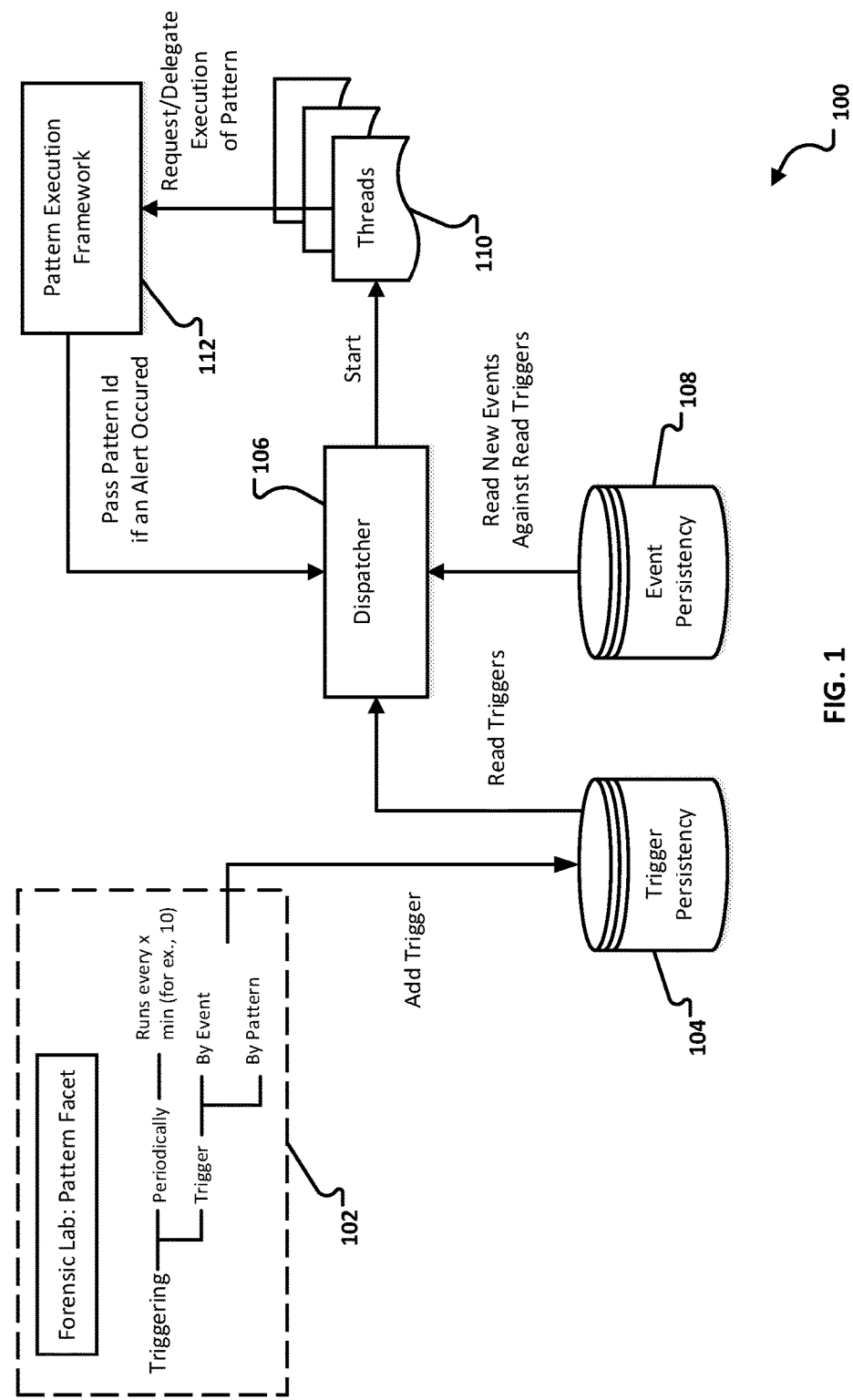
FIG. 1 is a block diagram illustrating data/process flow for a realtime enterprise threat detection (ETD) triggering framework, according to an implementation.

The following detailed description describes a realtime triggering framework for realtime enterprise threat detection (ETD), and is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

For the purposes of this disclosure, the term "real-time," "real time," "realtime," "real (fast) time (RFT)," "near(ly) real-time (NRT)," "quasi real-time," or similar terms (as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, and/or transmit the data.

ETD typically allows analyzing data (for example, log data) from various enterprise computing systems over known ETD patterns indicating threats to the computing systems. While the following description focused on the use of log data for analysis, other types of data associated with ETD computing systems can also be leveraged for ETD analysis using the described methodology. Currently ETD patterns are processed on a periodic basis, for example, every ten minutes. For this example timeframe, it can take up to ten minutes before a threat can be detected from analysis of entries in log files using one or more ETD patterns. This delay can potentially allow data theft, damage, etc. (including possibly to the ETD system itself which would further compromise ETD) to occur within the enterprise computing system until the threat detection system processes log data against particular ETD patterns at the next processing period threshold. However, increasing the processing period frequency (for example, to process an ETD pattern every minute or more frequently) to mitigate this concern, raises computational and resource loads on one or more computers due to the increased frequency of processing. As some types of enterprise computing system attacks occur very infrequently (for example, less than once per month), an approach to increase the period frequency is in direct conflict with a goal to decrease computer operation costs.

The disclosure describes a solution framework where an ETD pattern is executed on-demand. For purposes of this disclosure, "on-demand" means that ETD pattern execution is triggered as soon as content has arrived in a log file that is related to the ETD pattern or a particular event has occurred. For example, in an ETD pattern detection, a log file entry having a particular value in one of the fields is written to a log or an alert is raised by the processing of another ETD pattern (event detection) which triggers a subsequent ETD pattern(s) to execute. As a further example, a log entry could include the assignment of a particular role (for example, a supervisory or an administrative role) to a user. The assignment of the particular role could, for example, have been detected using a first ETD pattern and can trigger the use of a second ETD pattern used to detect the criticality of this role assignment (for example: 1) who is the particular user?; 2) identification of which user assigned the particular role?; and 3) what actions has the user been performing since the particular role was assigned?). If the role assignment is determined to have been critical (for example, the user himself/herself assigned the new role to themselves, the user has accessed a high-security database in the enterprise computing system, etc.), the second ETD pattern can initiate generation of an alert (for example, executing additional computer code, processes, etc. to generate an alert or notifying the first ETD pattern to initiate generation of an alert, locking down particular enterprise computing systems, temporarily suspending the role assignment, etc.).

FIG. 1 is a block diagram illustrating an example data/process flow for a realtime enterprise threat detection (ETD) triggering framework 100, according to an implementation. The data/process flow contains a forensic lab: pattern facet 102, trigger persistency 104, dispatcher 106, event persistency 108, processing thread(s) 110 (hereinafter "threads"), and pattern execution framework 112. As will be appreciated by those of ordinary skill in the art, the example data/process flow is one possible arrangement of components and data/process flow. Other components and data/process flows consistent with this disclosure are possible and are considered to be within the scope of this disclosure.

In addition to the ETD scheduled triggering pattern "Periodically" (as described above), a new ETD pattern execution mode called "Trigger" is introduced. The trigger mode allows an ETD pattern to be executed "By Event" or "By Pattern."

Figure 2:
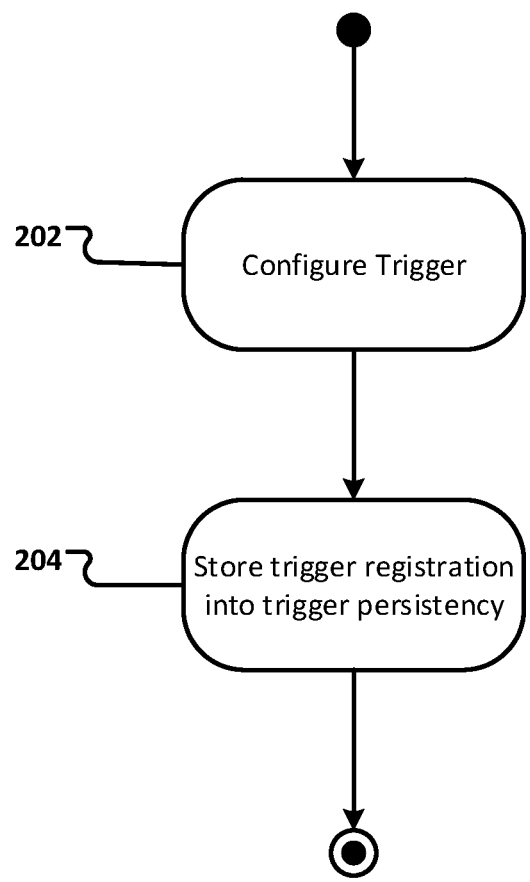
FIG. 2 is a flow chart illustrating trigger creation activity for the realtime ETD triggering framework, according to an implementation.

FIG. 2 is a flow chart illustrating trigger creation activity 200 for the realtime ETD triggering framework, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, an ETD triggering configuration application (for example a forensic lab configuration application—not illustrated) that is associated with the forensic lab: pattern facet 102 is used by an ETD pattern designer to configure a triggering mode (for example, either "Periodically" or "Trigger") and associated trigger(s). In the case of triggering mode "Trigger," a selection can then be made of "By Event" or "By Pattern." From 202, method 200 proceeds to 204.

At 204, for a configured trigger (either by event or by pattern), a trigger registration (for example, an entry in the example table "Trigger" below) is generated and added to a registration list (not illustrated) stored in the trigger persistency 104.

The trigger persistency 104 is typically a database (for example, either a conventional or in-memory database) used to store the registration list of trigger registrations. In other implementations, the trigger persistency 104 can use any type of data storage and data structure consistent with this disclosure. In one particular implementation, a trigger entry (each entry in the entity Trigger corresponds to one registration) could be defined similarly to:

```
entity Trigger
{
    key PatternId          : Binary(16);
    key TriggerName        : String(5000);
    key TriggerType        : String(5000);
    ChangeTimestamp        : UTCTimestamp;
    Namespace              : String(500);
};
``` where TriggerName is either a PatternId of the triggering ETD pattern (in case of triggering by Pattern) or a SemanticEventId (in case of triggering by Event). From 204, method 200 stops.

Returning to FIG. 1, a dispatcher 106 (see below), whose response time is relatively significant in the ETD triggering framework 100, has only read to the trigger persistency 104. For example, read access in an in-memory database is extremely fast. Write accesses to the trigger persistency 104 are performed during ETD pattern design time where high performance is not a significant factor.

In the example of a selected "By Event" trigger, one or more values of a semantic event are set (registered content), which are used as trigger content, and an ETD pattern name (registered ETD pattern) identified to execute if the trigger is activated. If the semantic event contains a registered value, the trigger is activated and the registered ETD pattern is executed.

In the example of a selected "By Pattern" trigger, the registration list typically contains content relevant for ETD pattern triggering (registered content) and an identified ETD pattern name to execute (registered ETD pattern). With the registered content and the registered ETD pattern, the registration list can be used to quickly and efficiently check whether registered content has been detected. If the registered content is detected, the registered ETD pattern is executed.

For example, if example registrations (entries in entity Trigger) resemble:

| PatternId | TriggerName | TriggerType | ChangeTimestamp | Namespace |
|---|---|---|---|---|
| A | X | ByPattern | ... | ... |
| A | Y | ByPattern | ... | ... |

After execution of pattern X, pattern A is executed if the execution of pattern X results in an Alert. The same is also true for pattern Y, that is, if after execution of pattern Y, any alerts occur, then the pattern A is called.

In the example of a selected "By Events" trigger, the example registration could resemble:

| PatternId | TriggerName | TriggerType | ChangeTimestamp | Namespace |
|---|---|---|---|---|
| A | SemEventNameB | ByEvent | ... | ... |
| A | SemEventNameC | ByEvent | ... | ... |

In this case the Dispatcher (more precisely, the "By Event" Trigger Manager 304—see FIG. 3) checks in the events persistency 108 if logs with Entries corresponding to SemEventNameB and SemEventNameC arrived. If so, then pattern A is called. Technical implementations are typically efficient enough to allow fast execution (for example, every second) to check if any log entries arrived that correspond to TriggerNames.

ETD patterns are data objects saved in JSON format in our pattern persistency. ETD patterns contain paths. Each path contains subsets, which represent WHERE conditions (for example "filter only systems A, B, and C" or "do not consider IP addresses starting with ".10," etc.). Paths can be connected over references (which are represented by JOINS). Each pattern is translated into an SQL query, meaning that a pattern execution is a SQL query execution. Alerts are pattern results or query execution results.

After execution of an ETD pattern (any type of ETD pattern—scheduled or triggered) and if the executed ETD pattern results in an alert(s), the pattern execution framework 112 calls the dispatcher 106 and passes the PatternId of the executed ETD pattern. Dispatcher 106 checks in the trigger persistency 104 for registrations for the received PatternId (for example, using field "TriggerName") with a triggering type of "By Pattern" (for example, using field "TriggerType"). If YES, then corresponding ETD patterns are executed in parallel using different threads 110.

The dispatcher 106 is a computational daemon thread or a job executing at a high frequency (for example, every 1 sec.). The dispatcher 106 accesses and analyzes one or more events in the event persistency (for example, arriving log entries) and determines, using the registration list stored in the trigger persistency 104, whether arriving content in one or more events has been associated with a trigger (whether by event or by pattern). Given the dispatcher 106's computational speed, the system is considered to run in realtime or in substantially realtime. If a determination is made that such content has arrived, corresponding ETD patterns are selected for processing and threads 110 established for processing the corresponding ETD patterns. With this methodology, execution of an ETD pattern is "on demand," meaning when corresponding event data demands that an ETD pattern be triggered to be executed. With triggered ETD patterns there are no unneeded scheduled ETD pattern executions that result in negative findings. This saves computing (hardware and software) resources.

Each of the selected ETD patterns is processed in a separate thread 110 to permit parallelization of ETD responses. Different ETD patterns triggered through the same log entry/entries are executed at the same time in parallel. This allows a potential threat to be reported more quickly than running through ETD patterns in some sequential order.

Dispatcher 106 reads "By Events" registrations from the trigger persistency 104. Each registration, in addition to a PatternId, contains a SemanticEventId. In the event persistency 108, there is a corresponding field containing a SemanticEvent. The dispatcher 106 determines (for example, every 1 second) if, for the SemanticEventIds, any events containing a corresponding SemanticEvent arrived in the event persistency 108. If the determination is TRUE, a list of such registrations is created. For each of these registrations, a thread 110 is allocated by the dispatcher 106 that processes an ETD pattern. Each thread 110 typically processes one ETD pattern one time and is stops following the processing to free any used computational resources (hardware and software).

A persistency call (triggering and event) is typically performed in one query call for efficiency. Analysis is strictly based on triggering persistency 104 registrations.

In typical implementations, a latest insertion timestamp of read events (from the event persistency 108) is persisted (for example, in a database, memory storage, etc.), so that the next reading from the event persistency 108 (for example, 1 second later) picks up immediately after the stored timestamp.

The event persistency 108 is typically a database (for example, either a conventional or in-memory database) used to store log data for an enterprise computing system. In other implementations, the event persistency 108 can use any type of data storage and data structure consistent with this disclosure. In some implementations, the event persistency 108 can be used to persist a subset of log data for an enterprise computing system (for example, only data applicable to certain defined periodic or trigger triggering while other enterprise computing system data can be stored in a different data store for analysis). This subset configuration might allow for faster processing of particular data, while the dispatcher 106 processed data for the remaining data using other data stores acting as additional event persistencies 108. In some implementations, more than one dispatcher 106 could be configured to execute in different threads/jobs to permit parallelization of the dispatcher for increased performance. In these implementations, the multiple dispatchers 106 can be configured to communicate with each other regarding, for example, status, triggered triggers, ETD pattern execution status, metrics, results, etc.

In a typical implementation, events are stored in a column table in the event persistency 108. This table is typically partitioned on a daily basis, so that, for example, up to 2 billion entries can be stored daily. Since the dispatcher 106's reading access time for the event persistency 108 is very short (for example, 1 second), the response time to evaluate if any ETD patterns should be triggered typically takes approximately 2 ms, which permits realtime ETD pattern triggering.

In a typical implementation, an example structure of the event persistency (field "TechnicalLogEntryType contains mentioned SemanticEvent that corresponds to SemanticEventId saved in field TriggerName in the trigger persistency 104):

```
entity Events
{
    Id                              : UUID;
    Timestamp                       : UTCTimestamp;
    TechnicalGroupId                : UUID;
    TechnicalLogEntryType           : ShortString;
    TechnicalNumber                 : Integer64;
    TechnicalNumberRange            : ShortString;
    TechnicalTimestampOfInsertion   : UTCTimestamp;
    AttackName                      : ShortString;
    AttackType                      : ShortString;
    CorrelationId                   : ShortString;
    CorrelationSubId                : ShortString;
    Event                           : ShortString;
    EventLogType                    : ShortString;
    EventMessage                    : LongString;
    EventScenarioRoleOfActor        : ShortString;
    EventScenarioRoleOfInitiator    : ShortString;
    EventSeverityCode               : ShortString;
    EventSourceId                   : ShortString;
    EventSourceType                 : ShortString;
    GenericAction                   : ShortString;
    GenericCategory                 : ShortString;
    GenericDeviceType               : ShortString;
    GenericExplanation              : LongString;
    GenericGeolocationCodeActor     : ShortString;
    GenericGeolocationCodeTarget    : ShortString;
    GenericOrder                    : Integer64;
    GenericOutcome                  : ShortString;
    GenericOutcomeReason            : ShortString;
    GenericPath                     : LongString;
    GenericPathPrior                : LongString;
    GenericPurpose                  : ShortString;
    GenericRiskLevel                : ShortString;
    GenericScore                    : Integer64;
    GenericSessionId                : ShortString;
    GenericURI                      : LongString;
    NetworkHostnameActor            : ShortString;
    NetworkHostnameInitiator        : ShortString;
    NetworkHostnameIntermediary     : ShortString;
    NetworkHostnameReporter         : ShortString;
    NetworkHostnameTarget           : ShortString;
    NetworkHostDomainActor          : ShortString;
    NetworkHostDomainInitiator      : ShortString;
    NetworkHostDomainIntermediary   : ShortString;
    NetworkHostDomainReporter       : ShortString;
    NetworkHostDomainTarget         : ShortString;
    NetworkInterfaceActor           : ShortString;
    NetworkInterfaceTarget          : ShortString;
    NetworkIPAddressActor           : ShortString;
    NetworkIPAddressInitiator       : ShortString;
    NetworkIPAddressIntermediary    : ShortString;
    NetworkIPAddressReporter        : ShortString;
    NetworkIPAddressTarget          : ShortString;
    NetworkIPBeforeNATActor         : ShortString;
    NetworkIPBeforeNATTarget        : ShortString;
    NetworkMACAddressActor          : ShortString;
    NetworkMACAddressInitiator      : ShortString;
    NetworkMACAddressIntermediary   : ShortString;
    NetworkMACAddressReporter       : ShortString;
    NetworkMACAddressTarget         : ShortString;
    NetworkNetworkPrefixActor       : ShortString;
    NetworkNetworkPrefixTarget      : ShortString;
    NetworkPortActor                : Integer;
    NetworkPortInitiator            : Integer;
    NetworkPortIntermediary         : Integer;
    NetworkPortReporter             : Integer;
    NetworkPortTarget               : Integer;
    NetworkPortBeforeNATActor       : Integer;
    NetworkPortBeforeNATTarget      : Integer;
    NetworkProtocol                 : ShortString;
    NetworkSessionId                : ShortString;
    NetworkSubnetIdActor            : UUID;
    NetworkSubnetIdInitiator        : UUID;
    NetworkSubnetIdIntermediary     : UUID;
    NetworkSubnetIdReporter         : UUID;
    NetworkSubnetIdTarget           : UUID;
    NetworkZoneActor                : ShortString;
    NetworkZoneTarget               : ShortString;
    ParameterDirection              : ShortString;
    ParameterDirectionContext       : ShortString;
    ParameterName                   : ShortString;
    ParameterNameContext            : ShortString;
    ParameterDataType               : ShortString;
    ParameterDataTypeContext        : ShortString;
    ParameterType                   : ShortString;
    ParameterTypeContext            : ShortString;
    ParameterValueNumber            : Integer64;
    ParameterValueNumberContext     : Integer64;
    ParameterValueNumberPriorValue  : Integer64;
    ParameterValueString            : LongString;
    ParameterValueStringContext     : LongString;
    ParameterValueStringPriorValue  : LongString;
    ParameterValueDouble            : BinaryFloat;
    ParameterValueDoublePriorValue  : BinaryFloat;
    ParameterValueTimestamp         : UTCTimestamp;
    ParameterValueTimestampPriorValue : UTCTimestamp;
    PrivilegeIsGrantable            : Boolean;
    PrivilegeName                   : ShortString;
    PrivilegeType                   : ShortString;
    PrivilegeGranteeName            : ShortString;
    PrivilegeGranteeType            : ShortString;
    ResourceContainerName           : ShortString;
    ResourceContainerType           : ShortString;
    ResourceContent                 : LongString;
    ResourceContentType             : ShortString;
    ResourceCount                   : Integer64;
    ResourceName                    : ShortString;
    ResourceNamePrior               : ShortString;
    ResourceRequestSize             : Integer64;
    ResourceResponseSize            : Integer64;
    ResourceSize                    : Integer64;
    ResourceType                    : ShortString;
    ResourceSumCriteria             : ShortString;
    ResourceSumOverTime             : BinaryFloat;
    ResourceUnitsOfMeasure          : ShortString;
    ServiceAccessName               : ShortString;
    ServiceFunctionName             : ShortString;
    ServiceReferrer                 : ShortString;
    ServiceRequestLine              : LongString;
    ServiceType                     : ShortString;
    ServiceVersion                  : ShortString;
    ServiceApplicationName          : ShortString;
    ServiceExecutableName           : ShortString;
    ServiceExecutableType           : ShortString;
    ServiceInstanceName             : ShortString;
    ServiceOutcome                  : ShortString;
    ServicePartId                   : ShortString;
    ServiceProcessId                : ShortString;
    ServiceProgramName              : ShortString;
    ServiceTransactionName          : ShortString;
```

-continued

```
ServiceUserAgent              : ShortString;
ServiceWorkflowName           : ShortString;
SystemIdActor                 : ShortString;
SystemIdInitiator             : ShortString;
SystemIdIntermediary          : ShortString;
SystemIdReporter              : ShortString;
SystemIdTarget                : ShortString;
SystemTypeActor               : ShortString;
SystemTypeInitiator           : ShortString;
SystemTypeIntermediary        : ShortString;
SystemTypeReporter            : ShortString;
SystemTypeTarget              : ShortString;
TimeDuration                  : Integer64;
TimestampOfEnd                : UTCTimestamp;
TimestampOfStart              : UTCTimestamp;
TriggerNameActing             : ShortString;
TriggerNameTargeted           : ShortString;
TriggerTypeActing             : ShortString;
TriggerTypeTargeted           : ShortString;
UserLogonMethod               : ShortString;
UsernameActing                : ShortString;
UsernameInitiating            : ShortString;
UsernameTargeted              : ShortString;
UsernameTargeting             : ShortString;
UsernameDomainNameActing      : ShortString;
UsernameDomainNameInitiating  : ShortString;
UsernameDomainNameTargeted    : ShortString;
UsernameDomainNameTargeting   : ShortString;
UsernameDomainTypeActing      : ShortString;
UsernameDomainTypeInitiating  : ShortString;
UsernameDomainTypeTargeted    : ShortString;
UsernameDomainTypeTargeting   : ShortString;
UserIdActing                  : UUID;
UserIdInitiating              : UUID;
UserIdTargeted                : UUID;
UserIdTargeting               : UUID;
}.
```

Figure 3:
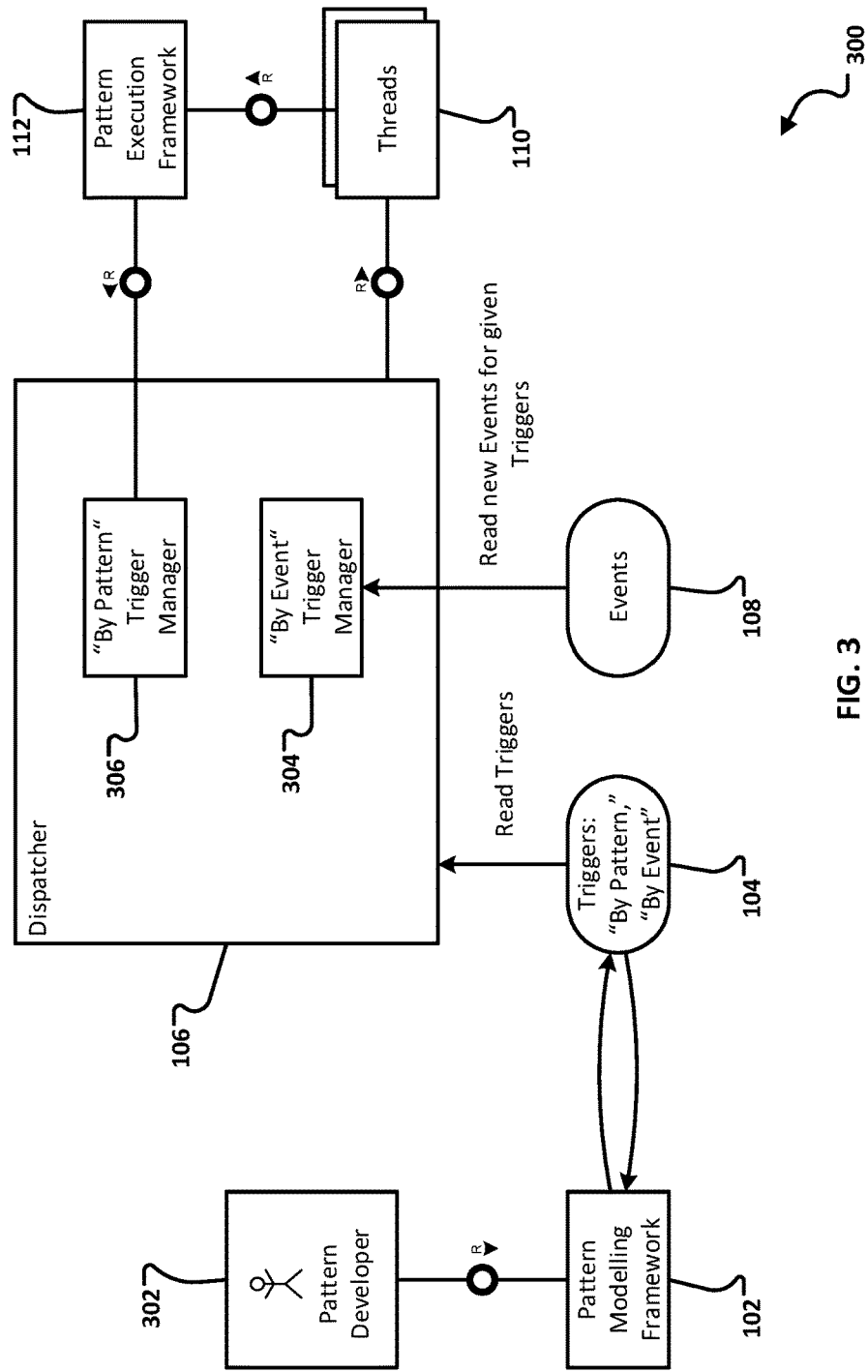
FIG. 3 is a block diagram illustrating additional detail of the dispatcher of the realtime ETD triggering framework, according to an implementation.

Turning to FIG. 3, FIG. 3 is a block diagram illustrating additional detail of the dispatcher of the realtime ETD triggering framework, according to an implementation. Expanding on the explanation above, FIG. 3 illustrates that a "By Event" trigger manager 304 reads "By Event" registrations from the trigger persistency 104. Each registration, in addition to containing a PatternId value, contains a SemantiEventId. A corresponding field contains a SemantiEvent. Dispatcher 106 determines (for example, every 1 second) if, for these SemanticEventIds, any events containing the corresponding SemanticEvent arrived in the event persistency 108. If the determining is TRUE, then a list of such registrations is created by the dispatcher 106 to allocated ETD patterns associated with the registrations to individual threads 110.

Returning to FIG. 1, dispatcher 106 creates triggering threads 110 that run independently from dispatcher 110. After threads 110 finished processing their assigned ETD patterns, no return to dispatcher happens and threads end themselves. Once the dispatcher 106 creates threads and passes PatternIds to the threads 110 to begin execution of corresponding ETD patterns, the dispatcher 106's job completes and it is ready to read a next portion of events from event persistency 108. Usually, the dispatcher 106 waits a configured time (for example, 1 second) for the next reading. In some implementations, the amount of time waited can be manually determined, dynamically determined, and dynamically-adjustable based on execution of various components of the ETD triggering framework 100, etc.

The threads 110 are typically written in JAVASCRIPT and delegate execution of ETD patterns to the pattern execution framework 112 (for example, using a library-to-library in-process communication) from within the same thread 110. In typical implementations, the pattern execution framework 112 is a JAVASCRIPT library that is able to execute ETD patterns. If ETD pattern execution returns a findings (particularly an alert), then the pattern execution framework 112 calls dispatcher 106 and passes the PatternId of the ETD pattern whose execution resulted in the alert. The dispatcher 106 reads the triggering persistency 104 to determine if there is a registration for triggering "By Pattern" for the PatternId.

If an alert results from the execution of an ETD pattern, pattern execution framework 112 detects the alert and sends a PatternId of the executed ETD pattern that caused the alert to the dispatcher 106.

Turning again to FIG. 3, FIG. 3 illustrates a "By Pattern" trigger manager 306. The "By Pattern" trigger manager 306 receives from the pattern execution framework 112 a PatternId of an ETD pattern whose execution resulted in alert(s).

In typical implementations, the content of field "TechnicalLogEntryType" in the example event persistence 108 structure above is converted (for example, name to id) and compared with field "TriggerName" in the trigger persistency 104. This conversion is typically computationally very fast. Note that other methods are possible to determining whether additional ETD patterns are registered to be executed following an alert raised when executing an ETD pattern. To the extent other methods are consistent with this disclosure, they are also considered to be within the scope of this disclosure.

If a determination is made that there are additional registered ETD patterns in the trigger persistency 104 corresponding to the PatternId received by the "By Pattern" trigger manager 306, for each additional trigger registration. A distinct thread 110 is allocated by dispatcher 106 to execute each ETD pattern associated with the trigger registration. Each thread 110 delegates the execution of its associated ETD pattern to the pattern execution framework 112. This approach allows the definition of chains (workflows) of ETD pattern processing. Using this methodology, complex and expensive ETD patterns can be divided into a chain of simple ETD patterns This division can reduce complexity and allows a chain to be broken/terminated if one of the chained ETD patterns results in no findings. At some point in the execution of an ETD pattern chain, a fork (for example, calling several ETD patterns simultaneously to execute in parallel) can also be performed. This forking functionality permits faster execution and receipt of ETD pattern execution results.

Returning to FIG. 1, pattern execution framework 112 can also determine if an alert resulting from an executed ETD pattern was previously reported. Pattern execution framework 112 persists alerts along with additional information (attributes) identifying this alert in a separate persistency layer (an alert persistency) (not illustrated). If an alert matches to an alert in the alert persistency, then no additional actions are done. If the alert does not match to any alerts in the alert persistency, then the alert is considered as a new alert and the dispatcher 106 receives control information for further processing. Consistent with the explanation above, an alert is a SQL query result (a table) that is returned by a SQL query execution (a pattern execution on a technical layer). Alerts are usually persisted by the pattern execution framework 112 for long periods of time (for example, years) for purposes such as auditability, later proof of a found attack/threat, etc.

In typical implementations, there is a monitoring user interface (not illustrated) for alert monitoring and a user interface for displaying ETD pattern execution results (also not illustrated). These user interfaces read over persisted alerts and execution results and execute in separate processes from the triggering framework (see FIG. 3) and pattern execution framework 112.

Figure 4A:
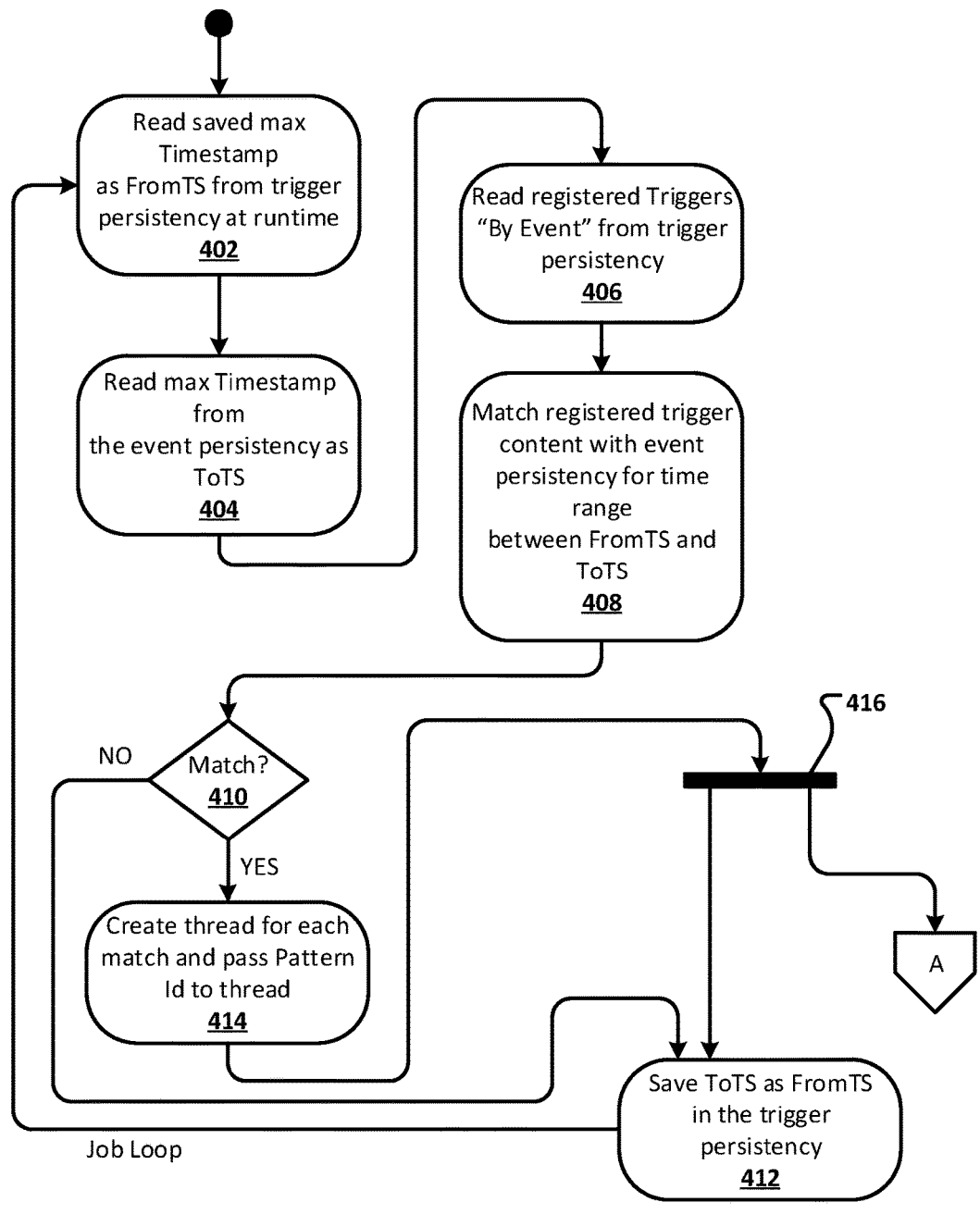
FIGS. 4A and 4B illustrate a flowchart of an example method for realtime ETD threat detection, according to an implementation.
Figure 4B:
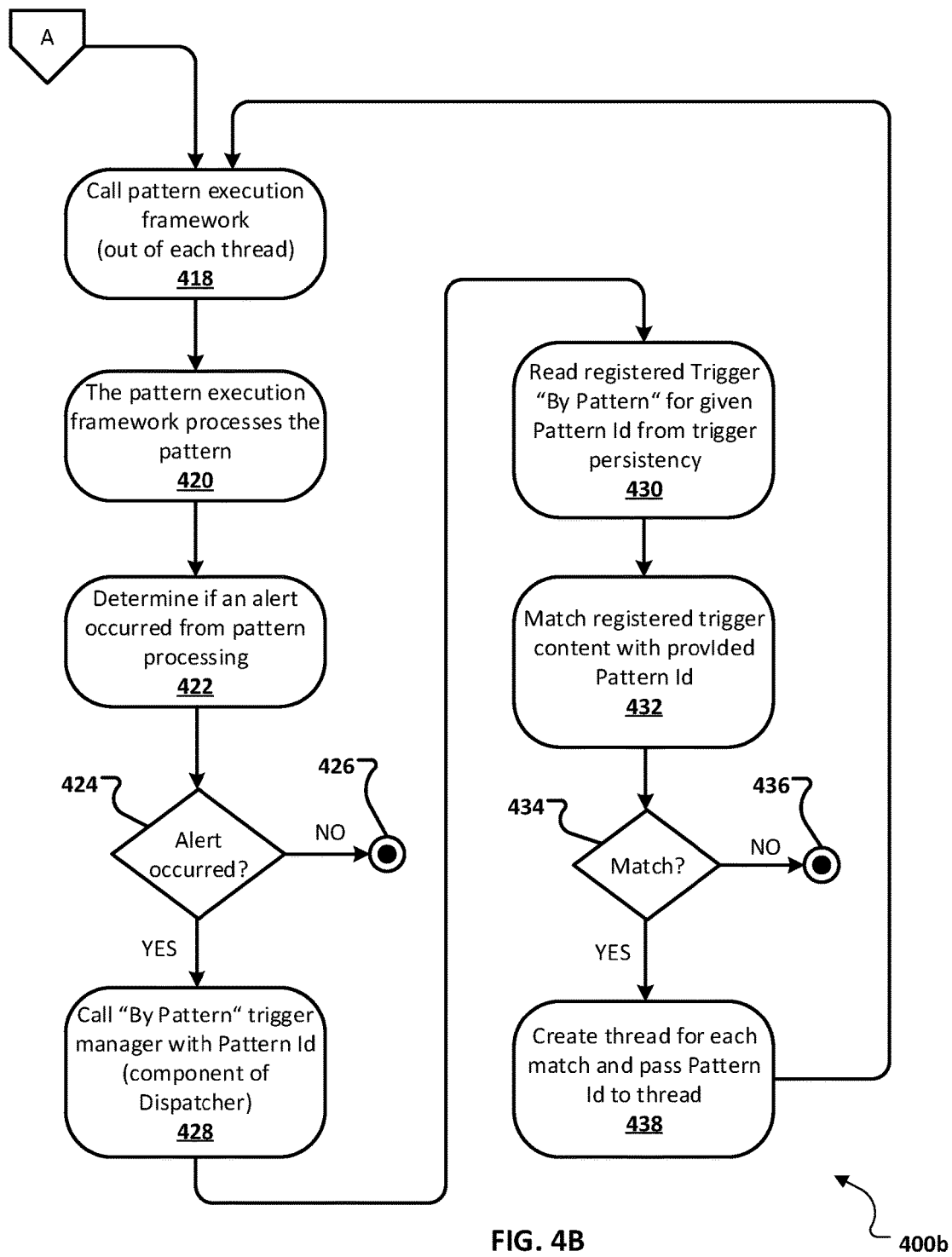

FIGS. 4B and 4B illustrate a flowchart of an example method 400 (400a & 400b) for realtime ETD threat detection, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, a saved maximum timestamp is read from the triggering persistency and assigned as FromTS. If a maximum timestamp value has not yet been saved, then the MAX timestamp of the logs in the events persistency is used instead as the FromTS value. This happens on the very first dispatcher job run after ETD installation. From 402, method 400 proceeds to 404.

At 404, a current maximum timestamp is read from the event persistency and assigned as ToTS. If there are no events in the event persistency, then the maximum timestamp of the events cannot be retrieved. In this case the further processing is skipped and the job loop starts from the beginning (after waiting of a configured repetition time, for example one second). This is likely to happen in an incomplete ETD installation or other anomalous system condition, when the dispatcher job is already running, but the event persistency is not yet receiving any logs data. From 404, method 400 proceeds to 406.

At 406, registered triggers of type "By Event" are read from the trigger persistency. From 406, method 400 proceeds to 408.

At 408, registered trigger content is matched with data from the event persistency associated with read events for the time range between FromTS and ToTS. From 408, method 408 proceeds to 410.

At 410, a determination is made as to whether read event data matches registered trigger content (by pattern) or one or more semantic value (by event) trigger registrations in the triggering persistency (in the registration list). If it is determined that a match has not occurred, method 400 proceeds to 412. Otherwise, if it is determined that a match has occurred, method 200 proceeds to 414.

At 412, the ToTS value is saved as FromTS in the trigger persistency. From 412, method 400 lob loop proceeds back to 402.

At 414, a thread is created for each match and a PatternId is passed to each thread identifying an ETD pattern to execute. From 414, method 400 proceeds to 416.

At 416, two actions are taken: 1) at 412, the ToTS value is saved as FromTS in the trigger persistency and the method 400 job loop proceeds back to 402; and 2) method 400 proceeds to 418 in FIG. 4B.

At 418, the pattern execution framework is delegated the task of executing/processing an ETD pattern by each thread. From 418, method 400 proceeds to 420.

At 420, method 420, the pattern execution framework processes the ETD pattern. The pattern execution framework notifies the thread when processing is complete so the thread can terminate. From 420, method 400 proceeds to 422.

At 422, the pattern execution framework determines if the execution of an ETD pattern resulted in an alert. From 422, method 400 proceeds to 424.

At 424, a determination is made as to whether an alert occurred from ETD pattern processing. If it is determined that an alert did not occur, method 400 proceeds to 426 where method 400 stops. Otherwise, if it is determined that an alert did occur, method 400 proceeds to 428.

At 428, the "By Pattern" trigger manager in the dispatcher is passed the PatternId of the ETD pattern that caused the alert. From 428, method 400 proceeds to 430.

At 430, the "By Pattern" trigger manager reads registered "By Pattern" triggers in the trigger persistency. From 430, method 400 proceeds to 432.

At 432, the "By Pattern" trigger manager attempts to match registered trigger content with the provided PatternId. From 432, method 400 proceeds to 434.

At 434, a determination is made as to whether a match exists between registered trigger content and the provided PatternId. If it is determined that a match does not exist, method 400 proceeds to 436 where method 400 stops. Otherwise, if it is determined that a match does exist, method 400 proceeds to 438.

At 438, a thread is created for each match and a PatternId is passed to each thread identifying an ETD pattern to execute. From 438, method 400 proceeds back to 418 to determine if an additional alert occurs from the execution of the ETD pattern.

Figure 5:
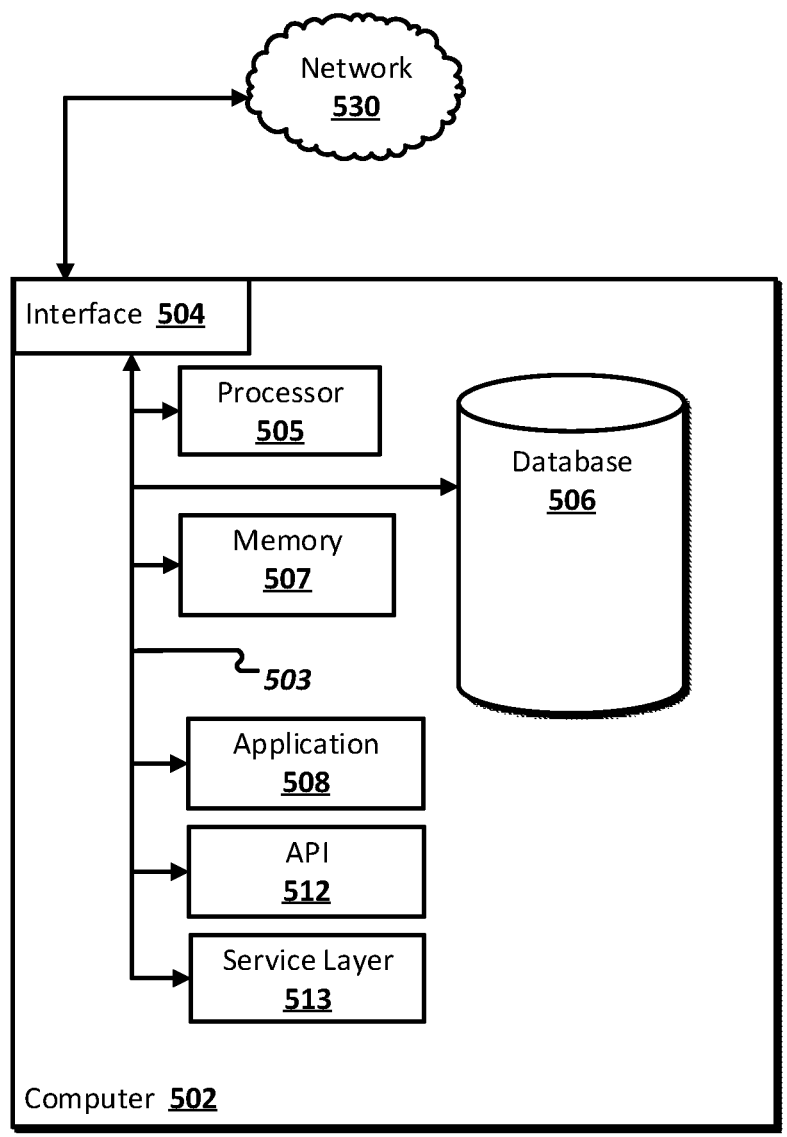
FIG. 5 is a block diagram of an exemplary computer system used to provide computational functionalities associated with described algorithms, methods, functions, processes, flows, and procedures as described in the instant disclosure, according to an implementation.

FIG. 5 is a block diagram of an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a GUI.

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, applications, etc. Further, although illustrated as a single application 508, the application 508 may be implemented as multiple applications 507 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: generating a trigger registration for a selected triggering type; storing the generated trigger registration in a triggering persistency; analyzing a received event from an event persistency; comparing data associated with the analyzed event with the triggering persistency; and based on the comparison, processing, using a pattern execution framework, an enterprise threat detection (ETD) pattern to perform actions responsive to the received event.

The foregoing and other described implementations can each optionally include one or more of the following features:

A first feature, combinable with any of the following features, wherein the triggering type includes one of the group consisting of by event and by pattern.

A second feature, combinable with any of the previous or following features, wherein the trigger registration is stored in a triggering persistency registration list.

A third feature, combinable with any of the previous or following features, comprising determining that the data associated with the analyzed event matches registered content or one or more semantic value trigger registrations in the triggering persistency registration list.

A fourth feature, combinable with any of the previous or following features, comprising: instantiating a processing thread to process the ETD pattern; and delegating the processing of the ETD pattern from the processing thread to the pattern execution framework.

A fifth feature, combinable with any of the previous or following features, comprising determining that execution of the ETD pattern generates an additional event.

A sixth feature, combinable with any of the previous or following features, comprising determining whether a triggering registration for the additional event exists in the triggering persistency.

In a second implementation, a non-transitory, computer-readable medium storing one or more instructions executable by a computer system to perform operations comprising: generating a trigger registration for a selected triggering type; storing the generated trigger registration in a triggering persistency; analyzing a received event from an event persistency; comparing data associated with the analyzed event with the triggering persistency; and based on the comparison, processing, using a pattern execution framework, an enterprise threat detection (ETD) pattern to perform actions responsive to the received event.

The foregoing and other described implementations can each optionally include one or more of the following features:

A first feature, combinable with any of the following features, wherein the triggering type includes one of the group consisting of by event and by pattern.

A second feature, combinable with any of the previous or following features, wherein the trigger registration is stored in a triggering persistency registration list.

A third feature, combinable with any of the previous or following features, comprising one or more instructions to determine that the data associated with the analyzed event matches registered content or one or more semantic value trigger registrations in the triggering persistency registration list.

A fourth feature, combinable with any of the previous or following features, comprising one or more instructions to: instantiate a processing thread to process the ETD pattern; and delegate the processing of the ETD pattern from the processing thread to the pattern execution framework.

A fifth feature, combinable with any of the previous or following features, comprising one or more instructions to determine that execution of the ETD pattern generates an additional event.

A sixth feature, combinable with any of the previous or following features, comprising one or more instructions to determine whether a triggering registration for the additional event exists in the triggering persistency.

In a third implementation, a computer-implemented system, comprising: a hardware processor interoperably coupled with a computer memory and configured to perform operations comprising: generating a trigger registration for a selected triggering type; storing the generated trigger registration in a triggering persistency; analyzing a received event from an event persistency; comparing data associated with the analyzed event with the triggering persistency; and based on the comparison, processing, using a pattern execution framework, an enterprise threat detection (ETD) pattern to perform actions responsive to the received event.

The foregoing and other described implementations can each optionally include one or more of the following features:

A first feature, combinable with any of the following features, wherein the triggering type includes one of the group consisting of by event and by pattern.

A second feature, combinable with any of the previous or following features, wherein the trigger registration is stored in a triggering persistency registration list.

A third feature, combinable with any of the previous or following features, configured to determine that the data associated with the analyzed event matches registered content or one or more semantic value trigger registrations in the triggering persistency registration list.

A fourth feature, combinable with any of the previous or following features, configured to: instantiate a processing thread to process the ETD pattern; and delegate the processing of the ETD pattern from the processing thread to the pattern execution framework.

A fifth feature, combinable with any of the previous or following features, configured to determine that execution of the ETD pattern generates an additional event.

A sixth feature, combinable with any of the previous or following features, configured to determine whether a triggering registration for the additional event exists in the triggering persistency.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:
1. A computer-implemented method, comprising:
generating a trigger registration for a selected triggering type;
storing the generated trigger registration in a triggering persistency;
analyzing a received event from an event persistency;
comparing data associated with the analyzed event with the triggering persistency; and
based on the comparison, processing, using a pattern execution framework, an enterprise threat detection (ETD) pattern data object to perform actions responsive to the received event, wherein the ETD pattern is translated into a structured query language (SQL) query, and wherein the ETD pattern contains paths connected over references and each path contains subsets representing conditions; and
upon detection of an alert based on processing of the ETD pattern, transmitting a pattern identification of the ETD pattern to a high-frequency computational daemon thread or a job which processes one or more other ETD patterns corresponding to the ETD pattern in parallel and by triggering separate processing threads to execute each other ETD pattern, wherein each separate processing thread completes processing of a particular other ETD pattern and ends with no return to the high-frequency computational daemon thread or the job.

2. The computer-implemented method of claim 1, wherein the triggering type includes one of the group consisting of by event and by pattern.

3. The computer-implemented method of claim 1, wherein the trigger registration is stored in a triggering persistency registration list.

4. The computer-implemented method of claim 3, comprising determining that the data associated with the analyzed event matches registered content or one or more semantic value trigger registrations in the triggering persistency registration list.

5. The computer-implemented method of claim 1, comprising:
   instantiating a processing thread to process the ETD pattern; and
   delegating the processing of the ETD pattern from the processing thread to the pattern execution framework.

6. The computer-implemented method of claim 1, comprising determining that execution of the ETD pattern generates an additional event.

7. The computer-implemented method of claim 6, comprising determining whether a triggering registration for the additional event exists in the triggering persistency.

8. A non-transitory, computer-readable medium storing one or more instructions executable by a computer system to perform operations comprising:
   generating a trigger registration for a selected triggering type;
   storing the generated trigger registration in a triggering persistency;
   analyzing a received event from an event persistency;
   comparing data associated with the analyzed event with the triggering persistency; and
   based on the comparison, processing, using a pattern execution framework, an enterprise threat detection (ETD) pattern data object to perform actions responsive to the received event, wherein the ETD pattern is translated into a structured query language (SQL) query, and wherein the ETD pattern contains paths connected over references and each path contains subsets representing conditions; and
   upon detection of an alert based on processing of the ETD pattern, transmitting a pattern identification of the ETD pattern to a high-frequency computational daemon thread or a job which processes one or more other ETD patterns corresponding to the ETD pattern in parallel and by triggering separate processing threads to execute each other ETD pattern, wherein each separate processing thread completes processing of a particular other ETD pattern and ends with no return to the high-frequency computational daemon thread or the job.

9. The non-transitory, computer-readable medium of claim 8, wherein the triggering type includes one of the group consisting of by event and by pattern.

10. The non-transitory, computer-readable medium of claim 8, wherein the trigger registration is stored in a triggering persistency registration list.

11. The non-transitory, computer-readable medium of claim 10, comprising one or more instructions to determine that the data associated with the analyzed event matches registered content or one or more semantic value trigger registrations in the triggering persistency registration list.

12. The non-transitory, computer-readable medium of claim 8, comprising one or more instructions to:
   instantiate a processing thread to process the ETD pattern; and
   delegate the processing of the ETD pattern from the processing thread to the pattern execution framework.

13. The non-transitory, computer-readable medium of claim 8, comprising one or more instructions to determine that execution of the ETD pattern generates an additional event.

14. The non-transitory, computer-readable medium of claim 13, comprising one or more instructions to determine whether a triggering registration for the additional event exists in the triggering persistency.

15. A computer-implemented system, comprising:
   a hardware processor interoperably coupled with a computer memory and configured to perform operations comprising:
   generating a trigger registration for a selected triggering type;
   storing the generated trigger registration in a triggering persistency;
   analyzing a received event from an event persistency;
   comparing data associated with the analyzed event with the triggering persistency; and
   based on the comparison, processing, using a pattern execution framework, an enterprise threat detection (ETD) pattern data object to perform actions responsive to the received event, wherein the ETD pattern is translated into a structured query language (SQL) query, and wherein the ETD pattern contains paths connected over references and each path contains subsets representing conditions; and
   upon detection of an alert based on processing of the ETD pattern, transmitting a pattern identification of the ETD pattern to a high-frequency computational daemon thread or a lob which processes one or more other ETD patterns corresponding to the ETD pattern in parallel and by triggering separate processing threads to execute each other ETD pattern, wherein each separate processing thread completes processing of a particular other ETD pattern and ends with no return to the high-frequency computational daemon thread or the job.

16. The computer-implemented system of claim 15, wherein the triggering type includes one of the group consisting of by event and by pattern.

17. The computer-implemented system of claim 15, wherein the trigger registration is stored in a triggering persistency registration list.

18. The computer-implemented system of claim 17, configured to determine that the data associated with the analyzed event matches registered content or one or more semantic value trigger registrations in the triggering persistency registration list.

19. The computer-implemented system of claim 15, configured to:
   instantiate a processing thread to process the ETD pattern; and
   delegate the processing of the ETD pattern from the processing thread to the pattern execution framework.

20. The computer-implemented system of claim 15, configured to:
   determine that execution of the ETD pattern generates an additional event; and
   determine whether a triggering registration for the additional event exists in the triggering persistency.

* * * * *